United States Patent [19]
Battocchio

[11] Patent Number: 5,707,167
[45] Date of Patent: Jan. 13, 1998

[54] EXTENDABLE ROD

[75] Inventor: Gilberto Battocchio, Bassano del Grappa, Italy

[73] Assignee: Lino Manfrotto & Co., S.p.A., Bassano Del Grappa, Italy

[21] Appl. No.: 657,185

[22] Filed: Jun. 3, 1996

[30] Foreign Application Priority Data

Jul. 5, 1995 [IT] Italy .................. PD95A0138

[51] Int. Cl.[6] ........................................ F16B 2/18
[52] U.S. Cl. ..................... 403/109; 403/374; 403/377
[58] Field of Search ........................ 403/109, 110, 403/377, 373, 374, 104, 321, 322, 108, 107, DIG. 8, 409.1

[56] References Cited

U.S. PATENT DOCUMENTS

| | | | |
|---|---|---|---|
| 1,794,999 | 3/1931 | Wilhelm | 403/107 X |
| 2,817,548 | 12/1957 | Uthemann | 403/104 |
| 3,110,506 | 11/1963 | O'Brien | 403/108 X |
| 4,029,279 | 6/1977 | Nakatani | 403/109 X |
| 4,407,166 | 10/1983 | Protze et al. | 403/104 X |
| 4,761,092 | 8/1988 | Nakatani | 403/109 X |
| 4,934,658 | 6/1990 | Berg et al. | 403/108 X |
| 5,154,449 | 10/1992 | Suei-Long | 403/109 X |
| 5,348,415 | 9/1994 | Carlsson | 403/109 X |

*Primary Examiner*—Harry C. Kim
*Attorney, Agent, or Firm*—Sughrue, Mion, Zinn, Macpeak & Seas, PLLC

[57] ABSTRACT

An extendable rod comprises a bracelet which is releasably lockable on a rod-shaped element of the rod, a depression which is formed in the bracelet and which can accommodate an end portion of a lever pivoted on the bracelet in such a manner as to permit the relative sliding of the bracelet on the rod-shaped element, and a surface which is raised with respect to the depression and which is engaged by the end portion of the lever in order to tighten the bracelet on the rod-shaped element.

7 Claims, 3 Drawing Sheets ns 5,707,167

EXTENDABLE ROD

BACKGROUND OF THE INVENTION

The present invention relates to an extendable rod including at least two rod-shaped elements which can slide telescopically into one another, and means for extending the rod and locking the rod-shaped elements in the extended position, these means comprising a bracelet which is mounted on one of the rod-shaped elements and which can be tightened thereon by means of a bolt, a lever pivoted on the bracelet by means of the bolt, and means providing a front cam between the lever and the bracelet for permitting sliding of the bracelet on the corresponding rod-shaped element in a first operative position of the lever and for tightening the bracelet on the corresponding rod-shaped element in a second operative position of the lever.

Rods having the above-mentioned characteristics are known, for example, from the current production of the Applicant and are customarily used as elements of frame structures, modular structures and sectional structures, or as a support for photo-cinematographic equipment.

In order to lock the bracelet on the corresponding rod-shaped element, the rods generally have a pair of front cams, which are respectively rotationally fast with the bracelet and with the lever in such a manner that they are rotated with respect to one another as a result of the rotation of the lever.

Because the lever is pivoted on the bracelet by means of the bolt and owing to the shape of the profile of the cam, the rotation of the lever in one sense enables the bracelet to be tightened on the rod-shaped element, while rotation in the opposite sense enables this tightening to be loosened in order to permit the sliding of the bracelet on the corresponding rod-shaped element.

Typically, these cams are provided on the lever and on the bracelet by relatively complicated machining.

The technical problem forming the basis of the present invention is to provide an extendable rod which is designed structurally and functionally to avoid all the disadvantages described with reference to the mentioned prior art.

SUMMARY OF THE INVENTION

This problem is solved by the invention by means of an extendable rod of the type indicated in the introduction which is characterised in that the means providing a front cam comprise at least a first depression in the bracelet, at least one end portion of the lever where the lever is pivoted on the bracelet, the end portion being received in the depression when the lever is in the first operative position, and at least one surface of the bracelet which is raised with respect to the depression so that the bracelet is tightened on the corresponding rod-shaped element when the end portion of the lever is engaged on the surface in the second operative position of the lever.

BRIEF DESCRIPTION OF THE DRAWINGS

The characteristics and advantages of the invention will become clear from the following detailed description of a preferred, but not exclusive, embodiment thereof illustrated by way of non-limiting example with reference to the appended drawings, in which.

DETAILED DESCRIPTION OF THE INVENTION

Figure 1:
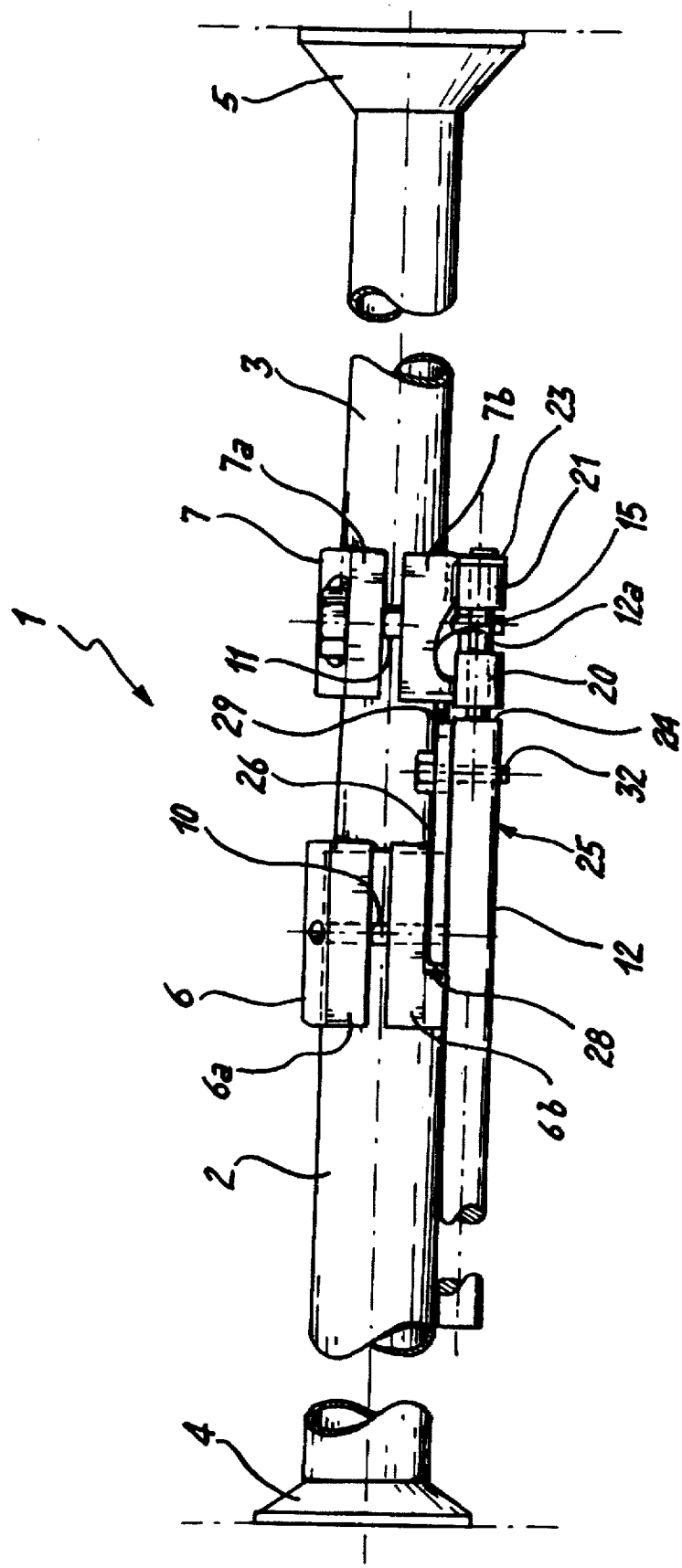
FIG. 1 is a front elevation of an extendable rod according to the invention.

In FIG. 1, an extendable rod produced in accordance with the present invention is generally indicated 1.

The rod 1 comprises two tubular rod-shaped elements 2, 3 which can slide telescopically into one another.

A respective foot 4, 5 having a widened base is arranged on the free end of each rod-shaped element 2, 3.

The rod 1 also comprises a first and a second bracelet, indicated 6 and 7, which are mounted respectively on the first and second rod-shaped elements 2, 3. The two bracelets 6, 7 have the general shape of a cylindrical sleeve which is open along one of its generatrices, in the area of which the bracelets 6, 7 have respective wings 6a,b and 7a,b.

The first bracelet 6 is locked on the corresponding rod-shaped element 2 by means of a screw 10 tightened between the wings 6a,b.

The second bracelet 7 can be releasably locked on the corresponding rod-shaped element 3 by means of a bolt 11 extending between the wings 7a,b.

A lever, indicated 12, is pivoted at one 12a of its end portions on the bracelet 7 by means of the bolt 11.

The lever 12 belongs to a toggle-type expander lever mechanism generally indicated 25 which includes a link 26 of which the opposing ends 28, 29 are respectively hinged to the bracelet 6 by means of the screw 10 and are articulated to the lever 12 by means of a pivot pin 32 which passes through a slot 33 in the link 26 and is secured to the lever at a predetermined distance from the bolt 11.

In correspondence with the pivoting region of the lever 12, the bracelet 7 has a first depression, indicated by the reference numeral 15, which extends, starting from the free end of the wing 7b, along a directrix which is at an angle to the longitudinal directrix of the rod.

The depression 15 is formed in a surface 16 of the bracelet 7 which is raised with respect to that depression.

A second depression 17 is formed in the surface 16; this depression 17 extends along the longitudinal directrix of the rod 1 and intersects the first depression 15 in correspondence with the axis of the bolt 11.

The depression 15 is deeper than the depression 17 with respect to the lip of the surface 16 of the bracelet 7 and can receive the end portion 12a of the lever 12 when the latter is in a first operative position (FIG. 2) in which the bracelet 7 can slide freely on the rod-shaped element 3.

The depression 17 has a shape such that the end portion 12a of the lever is partially sunk therein when the lever 12 is in a second operative position (FIG. 3) in which the bracelet 7 is tightened, by means of the bolt 11, on the corresponding rod-shaped element 3.

According to a preferred embodiment of the invention, two rollers 20, 21 are mounted idly on the end portion 12a of the lever 12. The rollers 20, 21 are arranged axially, respectively between a shoulder 24 of the lever 12 and the end, pivoted on the lever, of the bolt 11, and between the end of the bolt 11 and a stop ring 23 mounted on the free end of the portion 12a.

Preferably, the rollers 20 and 21 are produced from plastics material (for example nylon or Teflon) or from metal material (for example bronze or brass) and are used to reduce the contact-induced surface friction between the end portion 12a and the surface 16 of the bracelet 7 on which said portion is engaged.

Figure 2:
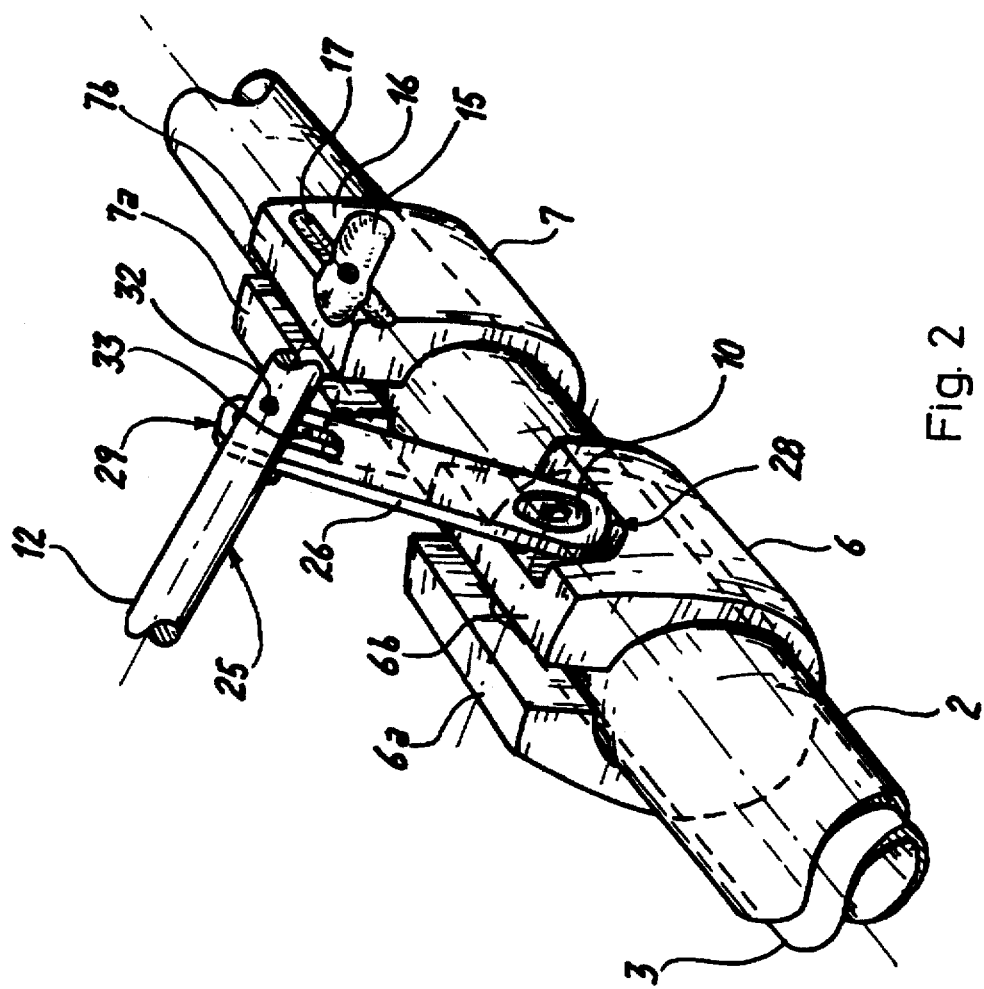
FIG. 2 is a perspective view of a detail of the rod of FIG. 1 in a first operative position.
Figure 4:
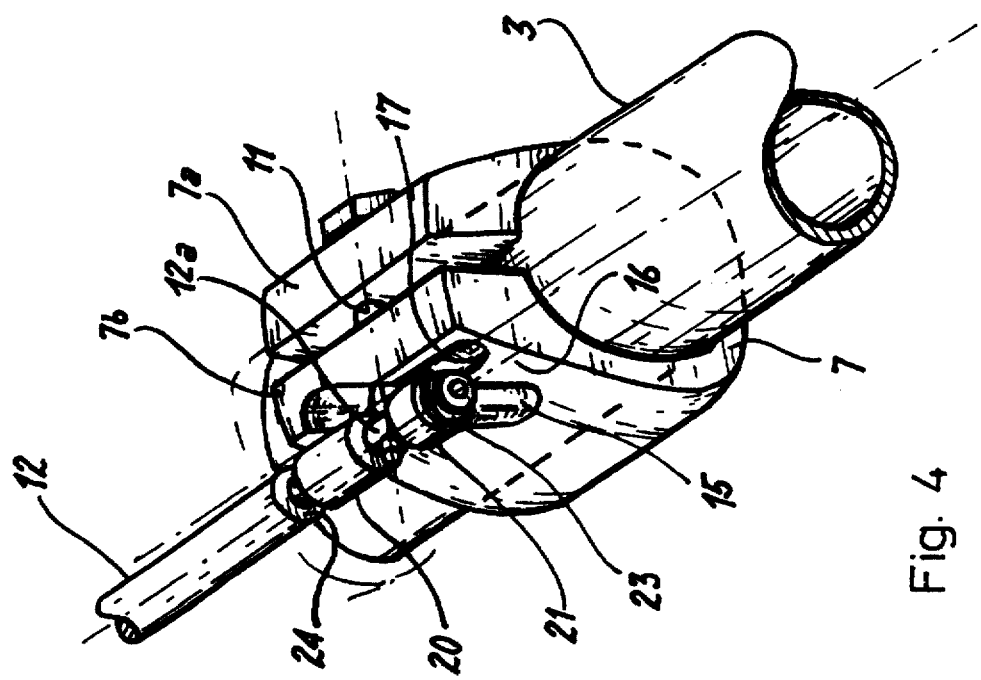
FIGS. 4 and 5 are perspective partial views of the detail of FIGS. 2 and 3.
Figure 5:
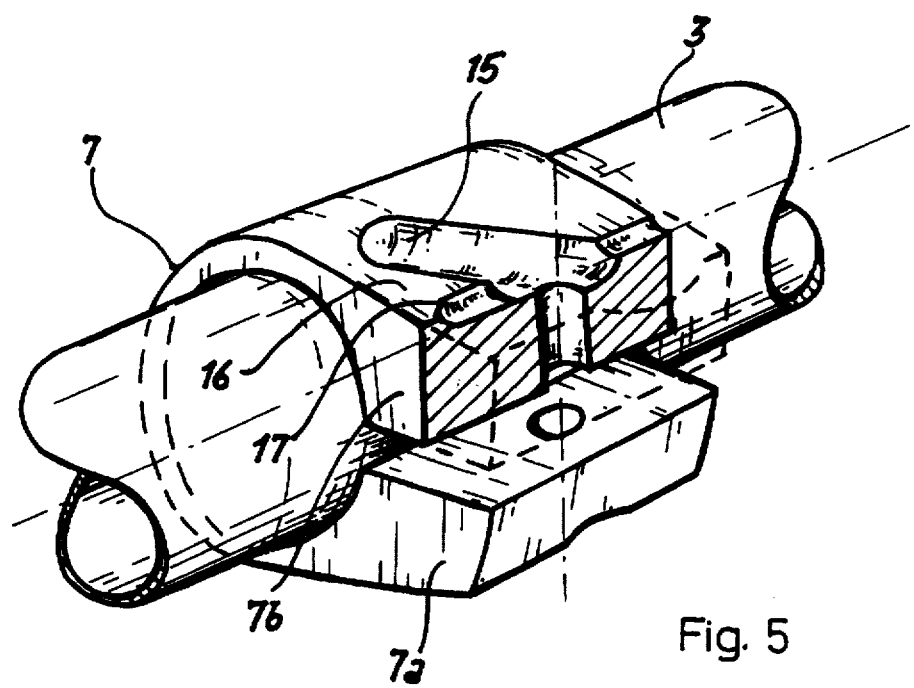

In FIG. 2, the lever 12 is represented in a first operative position. In that position, the rollers 20, 21 of the portion 12a are partially accommodated in the depression 15. The depth of the depression 15 with respect to the surface 16 is such that the bracelet 7 can slide freely relative to the rod-shaped element 3 so that it permits the desired positioning of the rod 1, as a function, for example, of the clear span between the walls against which the ends of the rod are pressed.

Figure 3:
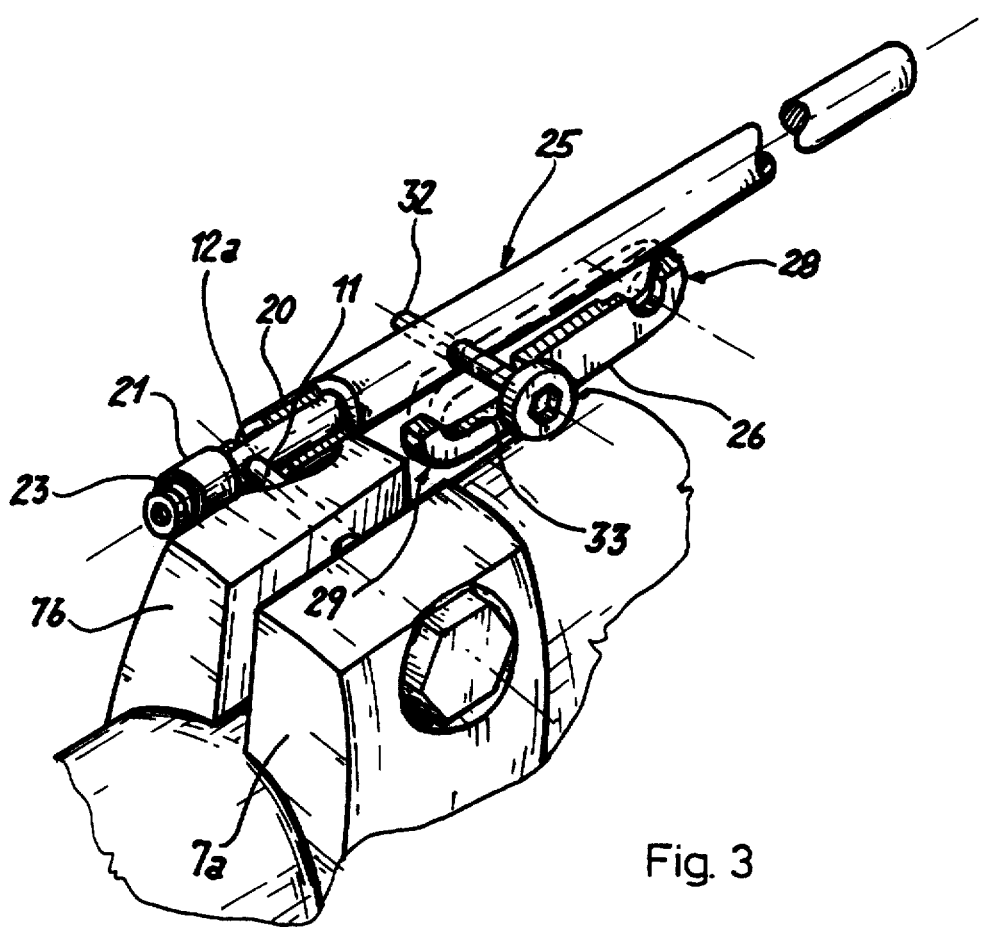
FIG. 3 is a partly sectional perspective view of the detail of FIG. 2 in a second operative position.

With that position preset, the lever 12 is rotated about the axis of the bolt 11 towards the second operative position of FIG. 3 in which it is locked in position parallel to the rod 1. As a result of the rotation of the lever 12, the surface 16 is engaged by the rollers 20, 21 of the end portion 12a. Since the surface 16 is raised with respect to the depression 15, the wings 7a,b are urged, by means of the bolt 11, to move towards one another in such a manner that the bracelet 7 is tightened on the rod-shaped element 3.

In substance, an effect similar to that of the front cam-providing coupling of rods produced in accordance with the prior art is obtained.

In the second operative position of the lever 12, the rollers 20, 21 are partially sunk in the depression 17, in such a manner as to prevent the inadvertent rotation of the lever 12. It will be noted that the depression 17 has a smaller depth than has the depression 15 and is selected in such a manner that the bracelet 7 is nevertheless firmly tightened, by means of the bolt 11, on the rod-shaped element 3 when the lever 12 is in the second operative position.

It will be observed that, owing to the rotation of the lever 12 from the first to the second operative position, the two bracelets 6, 7 are moved away from one another by the effect of the toggle-type expander lever mechanism with consequent extension of the rod 1.

What is claimed is:

1. An extendable rod including at least two rod-shaped elements which can slide telescopically into one another, and means for extending the rod and locking the rod-shaped elements in the extended position, said means comprising a bracelet which is mounted on one of the rod-shaped elements and which can be tightened thereon by means of a bolt, a lever pivoted on the bracelet by means of the bolt, and front cam means located between the lever and the bracelet whereby upon pivoting of the lever on the bolt to a first operative position said front cam means is operated to permit sliding of the bracelet on the corresponding rod-shaped element and upon pivoting of the lever on the bolt to a second operative position said front cam means is operated to tighten the bracelet on the corresponding rod-shaped element, characterised in that said front cam means comprise at least a first depression in the bracelet, at least one end portion of the lever where the lever is pivoted on the bracelet, the end portion being received in the depression when the lever is in the first operative position, and at least one surface of the bracelet which is raised with respect to the depression, so that the bracelet is tightened on the corresponding rod-shaped elements when the end portion of the lever is engaged on the surface in the second operative position of the lever.

2. A rod according to claim 1, wherein the surface has a second depression which is angularly offset with respect to the first depression, the end portion being at least partially sunk in the second depression when the lever is in the second operative position.

3. A rod according to claim 2, wherein the first depression has a greater depth than has the second depression with respect to a lip of the surface of the bracelet.

4. A rod according to claim 1, comprising means for reducing contact friction between the end portion and the surface.

5. A rod according to claim 4, wherein the means for reducing friction comprise at least one idle roller on the end portion of the lever.

6. A rod according to claim 2, comprising means for reducing contact friction between the end portion and the surface.

7. A rod according to claim 3, comprising means for reducing contact friction between the end portion and the surface.

* * * * *